(12) United States Patent
Costanzi et al.

(10) Patent No.: US 7,700,680 B2
(45) Date of Patent: Apr. 20, 2010

(54) POLYESTER COMPOSITIONS FLAME RETARDED WITH HALOGEN-FREE ADDITIVES

(75) Inventors: Silvestro Costanzi, Genoa (IT); Maurizio Leonardi, Genoa (IT)

(73) Assignee: Italmatch Chemicals S.p.A., Genoa (IT)

( * ) Notice: Subject to any disclaimer, the term of this patent is extended or adjusted under 35 U.S.C. 154(b) by 270 days.

(21) Appl. No.: 11/628,617

(22) PCT Filed: Jun. 10, 2004

(86) PCT No.: PCT/IB2004/001891
§ 371 (c)(1), (2), (4) Date: Feb. 7, 2007

(87) PCT Pub. No.: WO2005/121232
PCT Pub. Date: Dec. 22, 2005

(65) Prior Publication Data
US 2008/0090950 A1    Apr. 17, 2008

(51) Int. Cl.
*C08K 3/32*    (2006.01)
(52) U.S. Cl. .................................... 524/414
(58) Field of Classification Search ................ 524/414
See application file for complete search history.

(56) References Cited

U.S. PATENT DOCUMENTS

| | | | |
|---|---|---|---|
| 3,833,537 A | | 9/1974 | Jaquiss |
| 5,256,718 A | * | 10/1993 | Yamamoto et al. .......... 524/411 |
| 6,013,707 A | | 1/2000 | Kleiner et al. |
| 6,136,892 A | * | 10/2000 | Yamauchi et al. ........... 523/206 |
| 6,448,316 B1 | | 9/2002 | Hirano et al. |
| 6,503,969 B1 | * | 1/2003 | Klatt et al. ................... 524/133 |
| 7,169,838 B2 | * | 1/2007 | Engelmann et al. ......... 524/126 |
| 2003/0171494 A1 | | 9/2003 | Aramaki et al. |
| 2004/0051088 A1 | * | 3/2004 | Schlosser et al. ............. 252/609 |
| 2005/0137297 A1 | * | 6/2005 | De Wit ........................ 524/100 |
| 2007/0082995 A1 | * | 4/2007 | Costanzi et al. .............. 524/414 |

FOREIGN PATENT DOCUMENTS

| | | |
|---|---|---|
| CA | 1219390 | 3/1987 |
| DE | 101 37 930 | 2/2003 |
| EP | 0 442 465 A2 | 8/1991 |
| EP | 0 699 708 A2 | 3/1996 |
| JP | 51-59946 | 5/1976 |
| WO | 99/57187 | 11/1999 |
| WO | 03/014212 A1 | 2/2003 |

OTHER PUBLICATIONS

International Search Report for PCT/IB2003/004986 dated Mar. 12, 2004.
Database CA 'Online! Chemical Abstracts Service, Asano, *Fire-, heat-, and impact-resistant thermoplastic resin compositions*, XP002271202 and JP 2002-161211 Jun. 4, 2002.

* cited by examiner

*Primary Examiner*—Peter Szekely
(74) *Attorney, Agent, or Firm*—Nixon & Vanderhye P.C.

(57) ABSTRACT

The present invention relates to halogen-free flame retarded thermoplastic moulding compositions based on a polyester resin, a process for their preparation and halogen-free flame retarded corresponding articles.

The composition according to the invention comprises at least from 0.1 to 30% by weight of aluminium hypophosphite as halogen free flame retardant additive, in case in addition to a mixture of other halogen free flame retardant additives and at least from 5 to 95% by weight of a polymer based on polyester, particularly a linear polyester resin.

29 Claims, No Drawings

POLYESTER COMPOSITIONS FLAME RETARDED WITH HALOGEN-FREE ADDITIVES

This application is the US national phase of international application PCT/IB2004/001891, filed 10 Jun. 2004, which designated the U.S., the entire content of which is hereby incorporated by reference.

SUBJECT OF THE INVENTION

The present invention relates to halogen-free flame retarded thermoplastic moulding compositions based on a polyester resin, a process for their preparation and halogen-free flame retarded corresponding articles.

BACKGROUND OF THE INVENTION

The market is increasingly interested in halogen free flame retardant additives.

Significant requirements for these products are: high flame retardant effectiveness in reinforced and unreinforced articles, pale intrinsic color, good heat stability, good mechanical and electrical properties and low cost. Besides the halogen containing systems, the halogen-free Flame Retardant (FR) additives used in thermoplastic polymers are:

Inorganic flame retardants belonging, for example, to the metal hydroxide group (Magnesium hydroxide and Aluminium hydroxide); these products have to be used in large amounts to be effective and therefore mechanical properties of the related articles are dramatically damaged.

Melamine derivatives, like melamine cyanurate, melamine (poly)phosphate or melamine pyrophosphate. These products either do not have sufficient thermal stability for overcoming the processing conditions of some thermoplastic polymers or, in case of polyesters, are not fully satisfactory.

Organic derivatives of phosphoric acid such as phosphoric esters (valence state of P=+5) are also well known halogen free flame retardant additives. These products are not very effective and in addition they have several drawbacks: tend to bleed out on exposure to heat, are generally in a liquid state and therefore difficult to handle, have insufficient hydrolytic stability and may affect mechanical and thermal properties of final articles. Although many improvements have been introduced with the new high molecular weight products, such as for example, the condensate phosphate esters having a structure which is derived from Bisphenol A (JP nr 6-228426), however the related polymer articles do not have fully satisfactory performances due to the unbalanced combination of flammability with impact resistance, heat stability and weather resistance.

Red-Phosphorus has been proven to be an effective Flame Retardant additive (WO: 98/30632, WO: 99/27016, JPA: 11-335531, US 2003/0018108) but unfortunately the inherent deep-red colour makes the related polymer product difficult to be used for natural or light coloured applications.

Organic phosphinates, with particular regard to aluminium and zinc phosphinates, have been recently described (U.S. Pat. No. 5,281,637; EP 0699708; EP 0899296; WO 09739053) as a new family of halogen free flame retardant additives for polyesters, especially in combination with nitrogen containing compounds. These products are not fully satisfactory from the cost/performances point of view.

Hypophosphorous acid metal salts, otherwise called hypophosphites or inorganic phosphinates, have been also reported as halogen-free flame retardant additives for flame proofing styrene containing polymers (U.S. Pat. No. 4,618,633). Among these, calcium hypophosphite, is especially effective in glass filled polyester resin compositions made on PBT, when used in combination with nitrogen containing compounds like melamine pyrophosphate, urea phosphate, or polymeric melamine phosphate (U.S. Pat. No. 6,503,969, WO: 098117720; DE: 10137930, EP: 0919591). However, Calcium hypophosphite shows no effect as single additive as well as in combination with melamine cyanurate.

OBJECT OF THE INVENTION

It is an object of the present invention to provide flame retarded halogen free thermoplastic moulding compositions and articles based on polyester resins, particularly linear polyester resins, with and without glass fiber reinforcement which maintain good mechanical properties, good weather resistance along with good flame retardant grade.

Another object of the present invention is to provide halogen free flame retarded moulding compositions and corresponding moulded articles based on polyester resins, particularly linear polyester resins, with particular regard to glass fiber reinforced polyesters characterised by significant flame retardant properties and good electrical properties.

Still another object of the present invention is to provide halogen free flame retarded moulding compositions and articles based on polyester resins, particularly linear polyester resins, particularly glass fiber reinforced, ranking V0, according to the UL 94 classification standards and passing the GWIT test at 775° C., according the IEC 61335-1.

Another object of the present invention is to provide a process for the preparation of halogen free flame retarded moulding compositions, and articles based on polyester resins, particularly linear polyester resins.

DESCRIPTION OF THE INVENTION

The present invention relates to a thermoplastic composition comprising at least aluminium hypophosphite (aluminium phosphinate) as halogen-free flame retardant agent and at least a polymer based on polyester, particularly on a linear polyester resin.

According to the invention, the thermoplastic composition comprises:

A) From 5 to 95% by weight of at least a polyester resin;
B) From 0.1 to 30% by weight of at least aluminium hypophosphite as halogen free flame retardant additive, in case in addition to a mixture of other halogen free flame retardant additives;
C) From 0.5 to 10% by weight of at least an additive selected from: processing aids, heat and process stabilisers, UV stabilisers, antidripping agents (PTFE-Polytetrafluoroethylene), pigments, mould releasing agents, rubber elastic polymers, nucleating agent, or their mixtures;
D) From 0% to 50% by weight of an inorganic filler.

The total of the percentages by weight of components A to D is 100%.

It has been surprisingly found that the objects of the present invention are satisfied with thermoplastic moulded compositions and moulded articles which comprise at least aluminium hypophosphite (aluminium phosphinate), as halogen free flame retardant additive and at least a polymer based on linear polyester.

The invention is described in detail herein after with particular regard to the components which are comprised in the flame retardant thermoplastic resin compositions according to the present invention.

Component A)

The composition contains as component A) from 5 to 95%, preferably from 20 to 70% and more preferably from 35 to 60% of at least a thermoplastic polyester resin.

In the meaning of the invention thermoplastic polyester resin is any polyalkylene terephthalate, based on at least an aromatic dicarboxylic acid and at least an aliphatic or aromatic dihydroxy compound.

Such polyalkylene terephthalates are known per se and are described in the literature. They are produced by reacting aromatic dicarboxylic acids or their esters with aliphatic or aromatic dihydroxy compounds. Preferred aromatic dicarboxylic acids include terephthalic acid and isophthalic acid or their mixtures. Preferably not more than 10 mole % of the aromatic dicarboxylic acid may be replaced by aliphatic or cycloaliphatic dicarboxylic acids such as, for example, adipic acid, azelaic acid, sebacic acid or cyclohexan dicarboxylic acid.

Particularly preferred polyesters A) are polyalkylene terephthalates derived from alkanediols with 2 to 6 Carbon atoms, being particularly preferred polyethylene terephthalate and polybutylene terephthalate and/or their mixtures.

The viscosity number of the polyester A) is in the rage of from 50 to 220, preferably from 80 to 150, as measured in 0.5% strength by weight solution in a phenol/o-dichlorobenzene mixture (1:1) in accordance to ISO 1628.

Such polyesters may also contain up to 100 mval/kg, more preferably up to 40 mval/kg, of carboxylic end groups, as determined by potentiometric titration method.

For example, a moulding composition according to the present invention comprises, as component A), polyethylene terephthalate (PET) and polybuthylene terephthalate (PBT) in a mixture where PET polymer ranges from 10% to 30% weight on the weight of polymers.

It is also advantageous to use recycled PET (also named scrap PET) in mixture with virgin PBT polymer.

The recycled materials are generally:
the post industrial products such as sprues from injection moulding, start up material from injection moulding and extrusion or edge trims from extruder sheets or films;
post consumer recycled materials such as blow-moulded PET bottles, collected and treated after utilization by the end consumer.

The recycled materials may be used as pellets or as regrind

Because polyesters may undergo hydrolytic cleavage during processing and due to the moisture content, it is advisable to pre-dry the recycled and the virgin materials up to a residual moisture content lower than 0.6%.

Fully aromatic polyesters, derived from aromatic dicarboxylic acids and aromatic dihydroxy compounds, may also be regarded as component A).

Suitable aromatic dicarboxylic acids are for example the above mentioned polyalkylene terephthalates. As aromatic dihydroxy compounds a or mixture of products belonging to the following list, are particularly preferred:
4,4'-dihydroxydiphenyl
2,4-di (4'hydroxyphenyl)-2-methylbutane
αα'-di(4-hydroxyphenyl)-p-diisopropylbenzene,
2,2-di(3'-chloro4'hydroxyphenyl)propane,
2,2'-di(4'-hydroxyphenyl)propane,
1,1-di(4'hydroxyphenyl)cyclohexane,
3,4'-dihydroxybenzophenone,
4,4'-dihydroxydiphenylsulfone,
2,2-di(3'5'-dimethyl-4'-hydroxyphenyl)propane.

Always according to the invention, mixtures of polyalkylene terephthalates and fully aromatic polyesters may also be used.

For the purpose of the present invention the component A) includes also mixtures of the previously mentioned polyesters with polycarbonates which might have been obtained by polymerizing an aromatic dihydroxy compound such as Bisphenol A, with phosgene. The amount of Polycarbonates may be up to 50% by weight based on the 100% by weight of the component A).

It is also possible to use polyester block copolymers or copolyesters obtained as reported in literature (i.e.: U.S. Pat. No. 3,651,014)

Component B)

The novel moulding compositions comprise as component B) from 0.1 to 30% by weight on weight of moulding composition, preferably from 2% to 20% by weight, of the inorganic aluminium phosphinate corresponding to the chemical formula Al $(H_2PO_2)_3$.

The aluminium phosphinate, also known as aluminium hypophosphite, may be used alone as well as in combination with other halogen free flame retardant additives.

Aluminium hypophosphite is obtained by reacting sodium hypophosphite and aluminium chloride in watery solution at a temperature of about 100° C. as reported in the literature (J. Chem. Soc. 1952, 2945).

The aluminium hypophosphite is thermally stable; it does not cause decomposition of polymers during processing, it does not affect the plastic moulding composition and the mechanical and aesthetic properties of polymer articles.

The product is sparingly soluble in water therefore it does not affect the electrical properties of polymer articles, particularly the CTI value; furthermore it is hardly extracted by the water allowing the flame proofing effect during time life of polymer articles even exposed under severe conditions (high Temperature and humidity).

The polymer compositions, which contain aluminium hypophosphite, develop:
good flame retardant grade ranking V0 at 0.8 mm in thickness, according to UL 94 standards,
good resistance to the incandescent wire passing GWFI (glow wire flammability index) at 960° C. and GWIT (glow wire ignition temperature) at 775° C. for all thicknesses higher than 1 mm when tested according the IEC 61335-1 standards,
a good electrical properties with a CTI value (comparative tracking index) of about 600 V when it has been measured according to IEC 112 with standard solution A.

In order to achieve the above performances, it is advisable that the average particle size (D50%) of the aluminium phosphinate powder is lower than 40 μm and the highest particle size is below 100 μm, more preferably D50% should be below 15 μm and the highest particle size is below 30 μm.

The preferred non halogen containing flame retardant additives to be used according to the invention, in combination with aluminium hypophosphite, are:
Organic phosphoric esters including for example triphenylphosphate (TPP), tricresylphosphate, trixylilenphosphate, trimethylphosphate, tributylphosphate, trioctylphosphate or similar products. The most preferred products are: bisphenol A bis (diphenyl) phosphate and resorcinol bis (diphenyl) phosphate. Both products are commercially available, for example, under the trade name of Fyroflex RDP and Fyroflex BDP manufactured by Akzo Nobel phosphorus chemicals.

Nitrogen containing products. Within the scope of the present invention, melamine pyrophosphate, polymeric melamine phosphate, melamine borate, guanidine cyanurate, urea cyanurate, benzoguanamine and their adducts with phosphoric and pyrophosphoric acids, tris hydroxyethylisocyanurate are suitable products. The most preferred product is melamine cyanurate. It may be obtained for example, by reacting equimolar amounts of melamine and cyanuric acid in aqueous solution at 90-100° C. The commercial available product is a white powder with an average particle size of 1.5 μm to 7 μm.

When used, the amount of the above co-agents with respect to the amount of the aluminium hypophosphite should stay in the range from 1/1 to 1/3, in order to reduce the bleed out of the products during compounding and moulding and not to affect the mechanical and thermal properties of final polymer articles.

Components C): processing aids, stabilisers, etc.

Novel thermoplastic moulding compositions may also contain as component C) one or more of the following conventional processing aids such as heat stabilisers, UV stabilisers, lubricants, mould releasing agents, colorants, plasticizers, impact modifier resins, antidripping agents, nucleating agents, antiacid components, etc. More in particular said additives, used as such or in mixture, may be present in a amount ranging from 0.5 to 10% by weight Examples of heat stabilisers are: sterically hindered phenols and/or aromatic phosphites or phosphonites, hydroquinones and mixture of these to be used, for example, in concentration of up to 1% weight on the weight of polymer composition.

UV stabilisers which are usually added in an amount of up to 2% weight on the weight of polymer composition are various salycilates, resorcinols, benzotriazols, benzophenones and hindered amines derivatives.

As lubricants and mould releasing agents are preferably selected the following compounds: long chain fatty acid, like stearic acid, or fatty acid salts, like sodium, calcium or zinc stearate, or montan waxes, or one ester or amide obtained by reacting saturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms. Examples of preferred esters and amides are: pentaerythritol tetrastearate, glycerol trilaurate, sorbitan dioleate, ethylenediamine distearate, glycerol stearate.

Among colorants the preferred products are: inorganic pigments like titanium dioxide, iron oxide, carbon black but can be also used the organic pigments like phthalocyanines, quinacridones, perylene, nigrosine, anthraquinones.

The novel moulding composition may also comprise from 0 to 1% by weight of fluorine-containing ethylene polymers which exhibit a resin melt dropping preventing effect when the composition is fired.

Examples of these fluorine-containing ethylene are: polytetrafluoroethylene (PTFE) or tetrafluoroethylene-hexafluoropropylene copolymers available in the market with Algoflon™.

Particularly preferred are those fluorine containing polymers with particle size from 0.1 μm to 10 μm.

The flame retardant moulding composition according to the present invention may further comprises a plasticizer to be used, for example, in an amount of up to 2% by weight on the weight of thermoplastic composition. These products generally enhance the dispersion of inorganic materials in the polymer matrix. Examples of the used plasticizers include phthalates, hydrocarbon oils and organosiloxanes bringing functional groups like hydroxyl, carboxyl, amino or epoxy group.

The flame retardant moulding composition of present invention may further contain one or more anti-acid components selected among the group of hydrotalcites, hydromagnesite, zinc oxide, zinc borate, magnesium carbonate, zinc stannate or similar products.

The impact modifier resins are generally copolymers which contain at least two of following monomers: ethylene, propylene, butadiene, isobutene, isoprene, vinyl acetate, styrene, acrylonitrile, acrylate and/or methacrylate. Some preferred kinds of impact modifiers are those known as ethylene-propylene (EPM) and ethylene-propylene-diene (EPDM) rubbers.

EPM and EPDM rubbers can preferably have been grafted with reactive carboxylic acids or with their derivatives such as for example: acrylic acid, methacrylic acid, maleic anhydride. Another group of preferred rubbers comprises copolymers of ethylene with acrylic and/or methacrylic acid which may include dicarboxylic acids such as maleic acid and fumaric acid, or derivatives of these acids, and/or monomers containing epoxy groups.

Polymers of this kind are known per se and described in the literature. They may be preferably prepared by random copolymerization at high pressure and elevated Temperature or by emulsion polymerization or by suspension polymerization.

Nucleating agents which may be used in the meaning of the present invention are: sodium phosphinate, sodium phenylphosphinate, alumina, silica and, preferably, talc and barium stearate.

Component D): the thermoplastic moulding composition of the present invention may optionally comprise a filler.

In the meaning of the present invention, filler can be any fibrous or particulate substance known in the art and acting as reinforcement agent.

Example of preferred fibrous fillers are carbon fibers, aramid fibers and, preferably, glass fibers to be used in the commercial available form of chopped glass.

In order to improve the compatibility with thermoplastic resins, the fibrous fillers may have been surface treated with a silane compound.

When used the fibrous fillers, the amount should range from 10% to 50%, preferably from 20% to 35% by weight on the weight of the resin: if the amount is lower than 10%, no advantage is observed in the mechanical properties and if the amount is higher than 50% by weight, the viscosity of the composition will be too high.

Example of particulate substances are glass beads, amorphous silica, chalk, mica, calcinated kaolin, wollastonite, talc, magnesium carbonate, or similar products and they may have been surface treated with fatty acids or the like or may have been milled in presence of fatty acids or the like.

Any particulate substance available into the market as an additive for thermoplastic resin is suitable for the use in the composition provided that the average size of the granules is in the range from 2 μm to 20 μm.

When used, the amount of the particulate substance to be added to the resin composition is up to 40%, preferably up to 30% by weight on the weight of resin composition. If the amount of particulate substance is higher than 40% the melt viscosity of the composition will be too high and the mouldability of the resin composition will be poor.

The above products can also be used in mixture.

Methods for preparing the resin compositions of the invention are known per se by mixing and kneading the starting components A) to C) and, optionally, D) in the predetermined ratio as above reported.

Mixing and kneading operations may be effected in any well known device like Banbury mixers, single screw extruders or twin screw extruders and then extruding them.

It is also possible to premix the starting components with thermoplastic resins in order to prepare masterbatches which may contain the individual components or whole additives in a predetermined ratio then dilute them with additional polymer in an extruder device for producing pellets.

The temperatures at which the components are kneaded generally range from 240° C. and 300° C.

The extrudes are cooled and pelletised.

The resulting pellets may be moulded into various mouldings through injection moulding, blow moulding or injection compression moulding.

The novel thermoplastic moulding compositions are endued with:
good flame retardant properties especially with the regard to the resistance to the incandescent wire at 775° C. and UL 94 at 1.6 mm and 0.8 mm in thickness;
good mechanical properties especially with the regard to the impact strength, the elastic modulus and yield strength;
good electrical properties passing a CTI value of about 600 V.

The moulding compositions of the present invention are suitable for applications in the electrical and electronic sectors such as parts for office automation appliances, lamp parts, plugs and multipoint connectors, coil formers, relay housings, etc.

The invention is described in more detail with reference to the following examples which, however are not intended to restrict the scope of the invention

EXAMPLES

The components reported in the tables below are compounded in a twin screw extruder set at temperature between 250-270° C. After pelletisation and drying the pellets were injection moulded into test specimens to be used for:
UL 94 flammability test method which prescribes:
the conditioning of 5 specimens (each formulation and thickness) for 24 h at 23° C. and 50% of relative humidity;
the positioning of each individual conditioned specimen in vertical position at about 20 cm from a below cotton flock;
2 applications of flame for each specimen (the second application starts as soon as the specimen ignited by the first application extinguishes).

The UL 94 results have been reported in accordance with the following meaning also prescribed by the specification:
V0: when the 5 tested specimens have got total afterburning time no longer than 50 sec, less than 10 sec each application of the flame, and no burning drops are allowed.
V1: when the 5 tested specimens have got total burning time less than 150 sec, less than 30 sec each application of the flame and no flaming drops are allowed.
V2: when the 5 tested specimens have got total afterburning time of less than 150 sec, less than 30 sec each application of the flame and flaming drops are allowed.

When the test results do not meet the above V0, V1 and V2 criteria, no classification (nc) has been marked in the below tables.
LOI determined in accordance to ISO 4589-1984
GWIT carried out in accordance to IEC 61335-1
CTI carried out in accordance to IEC 112 with standard solution A.

In the following examples following materials were used as starting components:

Components A): resins.
Polybuthylenterephthalate (Ultradur B 4500 manufactured by BASF)

Components B): flame retardant additives.
Aluminium hypophosphite in a white powder form, endued with an average particle size (d50%) of 5 μm and d98% below 15 μm manufactured by Italmatch Chemicals Spa under the trade name of Phoslite IP-A.
Resorcinol bis (diphenyl) phosphate (Fyroflex RDP) viscous liquid product, manufactured by Akzo Nobel Phosphorus Chemicals,
Melamine cyanurate white solid powder, endued with an average particle size of about 3 μm, manufactured by Italmatch Chemicals Spa under the trade name of Melagard 25

Components C): stabilisers and processing aids
In the examples have been used following products:
Hindered phenol heat stabiliser: Irganox® 1010 manufactured by Ciba specialty chemicals.
Lubricant:
Montan wax (E wax) manufactured by Hoechst
Glycerylmonostearate (Loxiol MG) manufactured by Cognis
Antiacid: zinc stearate manufactured by Sogis
Nucleating agent: Barium stearate Component D): filler and/or reinforcement agent
Wollastonite in the acicular form and with L/D (length to diameter) ratio of about 10/1
Chopped glass fibers of 10 μm in thickness (epoxysilanized)

Results
The table 1 shows that unfilled PBT articles can be flame retarded, ranking V0 at 1.6 mm in thickness, with both aluminium hypophosphite (Phoslite IP-A) alone as well as in combination with halogen-free flame retardant agents.

TABLE 1

Flame retardant effectiveness of Aluminium hypophosphite in unfilled PBT articles

| | formulations | | | | | | |
|---|---|---|---|---|---|---|---|
| | 1 | 2 | 3 | 4 | 5 | 6 | 7 |
| PBT (%) | 89.5 | 87.5 | 84.5 | 74.7 | 84.5 | 84.7 | 79.7 |
| Phoslite IP-A (%) | 10 | 12 | 15 | | 10 | 10 | 10 |
| Melagard 25 (%) | | | | 10 | 5 | | |
| RDP (%) | | | | 15 | | 5 | 10 |
| Loxiol MG | 0.2 | 0.2 | 0.2 | | 0.2 | | |
| Irg 1010 (%) | 0.3 | 0.3 | 0.3 | 0.3 | 0.3 | 0.3 | 0.3 |
| LOI (%) | na | 27 | 28 | na | na | na | na |
| UL 94 (3.2 mm) | V1 | V0 | V0 | V2 | V0 | V1 | V0 |
| UL 94 (1.6 mm) | V2 | V0 | V0 | V2 | V0 | V2 | V0 |

Notes:
na = not available

The results of the table 2 show that glass fiber reinforced PBT articles can be flame retarded, ranking V0 at 1.6 mm in thickness, with both aluminium hypophosphite alone as well as in combination with melamine cyanurate.

In addition the table shows that these articles pass the GWIT test at 775° C. and have good electrical properties (600V in CTI).

TABLE 2

Flame retardant effectiveness of Aluminium hypophosphite in PBT Glass fiber reinforced articles

| | formulations | | | | | | | | | |
|---|---|---|---|---|---|---|---|---|---|---|
| | 1 | 2 | 3 | 4 | 5 | 6 | 7 | 8 | 9 | 10 |
| PBT (%) | 54.1 | 49.1 | 54.1 | 52.1 | 49.1 | 51.1 | 54.1 | 54.1 | 57.1 | 57.1 |
| Phoslite IP-A (%) | 15 | 20 | 7.5 | 8.5 | 10 | 7.5 | 20 | 10 | 17 | 8.5 |
| Melagard 25 (%) | | | 7.5 | 8.5 | 10 | 7.5 | | 10 | | 8.5 |
| Wollastonite (%) | | | | | | 3 | | | | |
| Glass fibers (%) | 30 | 30 | 30 | 30 | 30 | 30 | 25 | 25 | 25 | 25 |
| Irg 1010(%) | 0.3 | 0.3 | 0.3 | 0.3 | 0.3 | 0.3 | 0.3 | 0.3 | 0.3 | 0.3 |
| Barium stearate (%) | 0.3 | 0.3 | 0.3 | 0.3 | 0.3 | 0.3 | 0.3 | 0.3 | 0.3 | 0.3 |
| Wax E (%) | 0.3 | 0.3 | 0.3 | 0.3 | 0.3 | 0.3 | 0.3 | 0.3 | 0.3 | 0.3 |
| UL 94 (3.2 mm) | V0 | V0 | V0 | V0 | V0 | V0 | V0 | V0 | V0 | V0 |
| UL 94 (1.6 mm) | V2 | V0 | V1 | V0 | V0 | V0 | V0 | V0 | nc | V0 |
| UL 94 (0.8 mm) | na | na | na | na | na | na | na | V0 | nc | V0 |
| GWFI at 960° C. | pass | pass | pass | pass | pass | pass | pass | pass | Pass | pass |
| GWIT at 775° C. (2 mm) | na | pass | fail | pass | pass | pass | na | na | na | na |
| GWIT at 775° C. (3 mm) | na | pass | pass | pass | pass | pass | pass | pass | pass | Pass |
| LOI (%) | na | 29 | 28 | 29 | 32 | 28 | 28 | 28 | na | 28 |
| CTI (V) | na | na | 600 | 600 | 600 | 600 | na | 600 | na | 550 |

Notes:
na = not available; nc = not classified according UL 94 test

The invention claimed is:

1. A halogen-free flame-retarded thermoplastic moulding composition of an aluminum phosphinate having the chemical formula $Al(H_2PO_2)_3$ as a halogen-free flame retardant agent and at least a polymer based on polyester, the molding composition consisting of
   A) from 5 to 95% by weight of said polyester;
   B) from 0.1 to 30% by weight of said aluminum hypophosphite,
   C) from 0.5 to 10% by weight of at least an additive selected from: processing aids, heat and process stabilizers, UV stabilizers, antidripping agents, pigments, mould releasing agents, rubber elastic polymers, nucleating agent, or their mixtures;
   D) from 0% to 50% by weight of an inorganic filler, where the total percentage by weight of components A) to D) is 100%.

2. Thermoplastic moulding composition according to claim 1, wherein said polyester is a linear polyester.

3. Thermoplastic moulding composition according to claim 1, which further comprises other halogen free flame retardant additives selected from organic phosphoric esters.

4. Thermoplastic moulding composition according to claim 1, wherein said antidripping agents are polytetrafluoroethylenes.

5. Thermoplastic moulding composition according to claim 1, comprising from 20% to 70% by weight of said polyester.

6. Thermoplastic moulding composition according to claim 1, comprising from 35% to 60% by weight of said polyester.

7. Thermoplastic moulding composition according to claim 1, wherein said polyester is selected from: polyalkylene terephthalates derived from alkanediols with 2 to 6 Carbon atoms.

8. Thermoplastic moulding composition according to claim 7, comprising said polyethylene terephthalate (PET) and polybutylene terephthalate (PBT) in a mixture where the PET polymer ranges from 10% to 30% weight based on the weight of the polymers.

9. Thermoplastic moulding composition according to claim 1, wherein said PET is recycled PET.

10. Thermoplastic moulding composition according to claim 1, wherein said polyester is selected from the group consisting of polymers prepared via reaction between at least an aromatic dicarboxylic acids or esters with at least an aliphatic or aromatic dihydroxy compounds.

11. Thermoplastic moulding composition according to claim 10, wherein part of said aromatic dicarboxylic acids or esters are replaced by aliphatic or cycloaliphatic dicarboxylic acids selected from adipic acid, azelaic acid, sebacic acid or cyclohexan dicarboxylic acid.

12. Thermoplastic moulding composition according to claim 10, wherein said aromatic dicarboxylic acids are selected from terephthalic acid, isophthalic acid or their mixtures.

13. Thermoplastic moulding composition according to claim 10, wherein said aliphatic or aromatic dihydroxy compounds are selected from:
   4,4'-dihydroxydiphenyl
   2,4-di(4'hydroxyphenyl)-2-methylbutane
   αα'-di(4-hydroxyphenyl)-p-diisopropylbenzene,
   2,2-di(3'-chloro4'hydroxyphenyl)propane,
   2,2'-di(4'-hydroxyphenyl)propane,
   1,1-di(4'hydroxyphenyl)cyclohexane,
   3,4'-dihydroxybenzophenone,
   4,4'-dihydroxydiphenylsulfone, and
   2,2-di(3'5'-dimethyl-4'-hydroxyphenyl)propane.

14. Thermoplastic moulding composition according to claim 1 comprising a mixture of said polyester with at least a polycarbonate in an amount of up to 50% by weight based on the 100% by weight of said polyester, said polycarbonate being obtained via polymerisation of Bisphenol A, with phosgene.

15. Thermoplastic moulding composition according to claim 1 comprising from 0.1 to 30% by weight on weight of the composition, of said aluminum phosphinate.

16. Thermoplastic moulding composition according to claim 1 wherein said aluminum phosphinate has an average particle size (D50%) lower than 40 μm and a highest particle size below 100 μm.

17. Thermoplastic moulding composition according to claim 3, wherein said halogen free flame retardant additive is selected from: Bisphenol A bis (diphenyl) phosphate and resorcinol bis (diphenyl) phosphate, in an amount ranging from 1/1 to 1/3 with respect to the amount of said aluminum hypophosphite.

18. Thermoplastic moulding composition according to claim 1, comprising up to 1% by weight of a fluorine containing ethylene polymers selected from: polytetrafluoroethylene (PTFE) or tetrafluoroethylene-hexafluoropropylene copolymers.

19. Thermoplastic moulding composition according to claim 1, comprising a filler in a range from 10% to 50% by weight on the weight of the compound.

20. Thermoplastic moulding composition according to claim 19, wherein said fibrous filler is selected from carbon fibers, aramid fibers, and glass fibers.

21. A process for the preparation of a thermoplastic composition according to claim 1, wherein all components are mixed and kneaded in predetermined ratios, extruded and pelletized.

22. Process according to claim 21, wherein the kneading temperature is between 240° C. and 300° C.

23. A molded article of the thermoplastic moulding composition according to claim 1.

24. Thermoplastic molding composition according to claim 7 wherein said polyester is polyethylene terephthalate, polybutylene terephthalate or mixtures thereof.

25. Thermoplastic molding composition according to claim 15 which contains from 2% to 20% by weight of said aluminum phosphinate.

26. Thermoplastic molding composition according to claim 16 wherein the particle size is D50% below 15 μm and the highest particle size being below 30 μm.

27. Thermoplastic molding composition according to claim 19 wherein the filler is a fibrous filler.

28. Thermoplastic molding composition according to claim 19 wherein the filler is present in a range of 20% to 35% by weight.

29. Thermoplastic molding composition according to claim 19 wherein the filler is a fibrous filler present in a range of 20% to 35%.

* * * * *